Jan. 23, 1940.    J. G. SWAIN    2,188,271
DUAL RIM MOUNTING
Filed Dec. 20, 1935    2 Sheets-Sheet 1
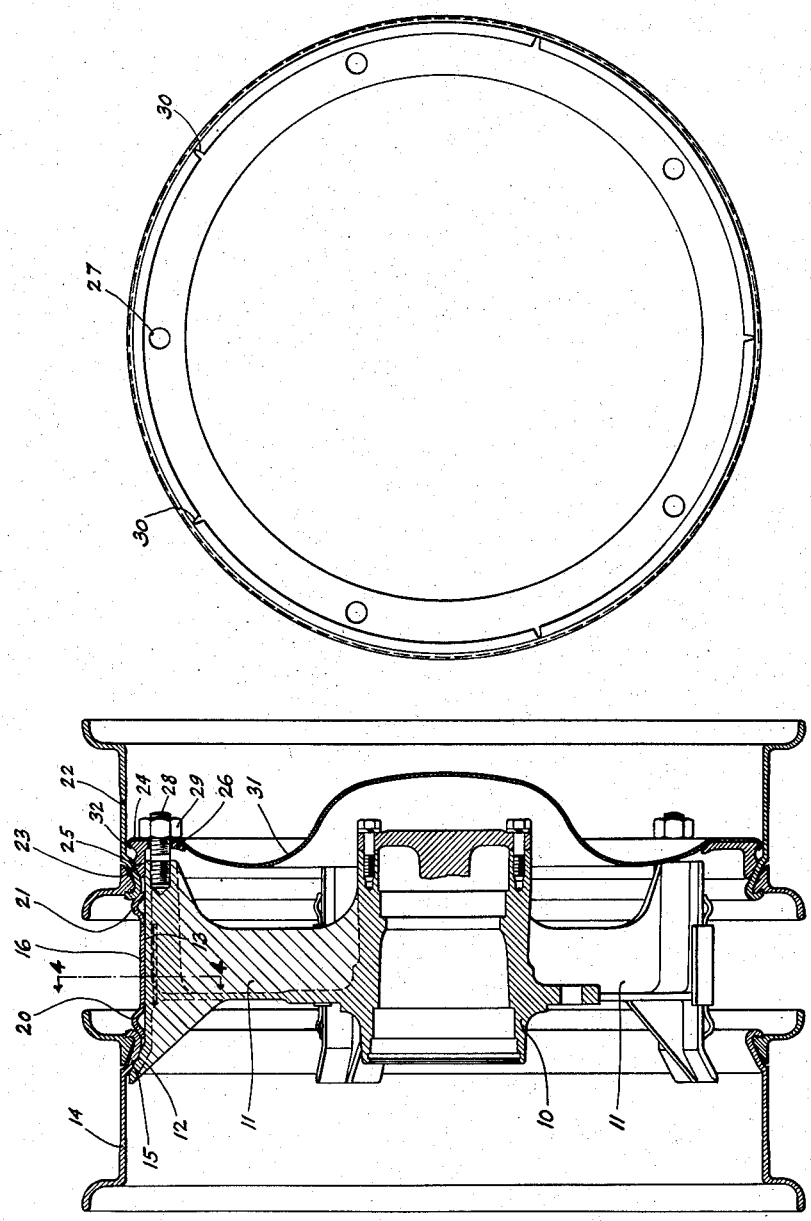
Inventor
JOSEPH G. SWAIN
By
Attorney Jan. 23, 1940.           J. G. SWAIN            2,188,271
                       DUAL RIM MOUNTING
                   Filed Dec. 20, 1935    2 Sheets-Sheet 2

Inventor
JOSEPH G. SWAIN
By
Attorney

Patented Jan. 23, 1940

2,188,271

UNITED STATES PATENT OFFICE 2,188,271

DUAL RIM MOUNTING

Joseph G. Swain, Akron, Ohio, assignor to Wingfoot Corporation, Wilmington, Del., a corporation of Delaware Application December 20, 1935, Serial No. 55,372

2 Claims. (Cl. 301—22)

This invention relates to a dual rim mounting, although not strictly limited to that type of mounting. One object of this invention is to provide an improved means for spacing dual rims on the wheel and particularly a spoke wheel not provided with a felloe. However, the invention may be applied to a wheel having a felloe without departing from the spirit of the invention.

Another object of this invention is to provide spacing elements readily removable from the ends of the spokes of a wheel for spacing a pair of rims on the wheel and for permitting the assembling and disassembling of the rims, particularly the inboard rim. Another object of this invention is to provide improved means for clamping a rim to a wheel whether of the dual-rim or single-rim variety.

Another object of this invention is to provide a clamping ring for a dual wheel integral with a disc which completely covers the wheel on one side thereof when the clamping ring and disc are in operative position.

Another object of this invention is to provide a clamping ring which simultaneously clamps a rim on the periphery of a wheel, and a cover plate or disc in position over one side of said wheel to entirely cover that exposed side whereby the disc is removably held in place.

Another object of this invention is to provide a clamping disc having a peripheral inturned edge forming a clamping ring for clamping a rim to a wheel, the outer surface of the inturned portion being preferably beveled to exert a wedging action during the clamping operation.

Other objects of this invention will appear hereinafter as the description thereof proceeds, the novel features, arrangements and combinations being clearly set forth in the specification and in the claims thereunto appended.

In the drawings:

Fig. 1 is a vertical cross-section through a wheel embodying my invention;

Fig. 2 is an elevational view of the inside of the disc which forms the clamping means for the rim and the cover for the wheel;

The present invention contemplates the use of individual spacer elements on the ends of wheel spokes, or individual spacer elements arranged about the periphery of a felloe with clamping means for clamping the rims spaced by said spacer elements comprising a disc, the outer edge of which is formed as a clamping ring for clamping the rims in position.

Figure 4:
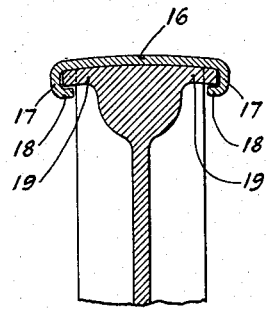
Fig. 4 is a cross-section taken on the line 4—4 of Fig. 1.
Figure 7:
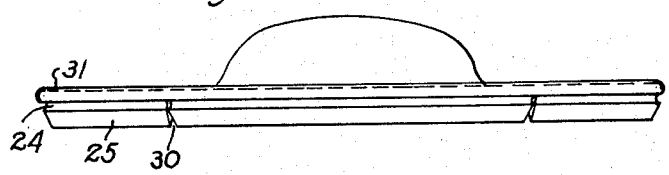
Fig. 7 is a plan view of the disc shown in Fig. 2.

In Figs. 1, 2 and 7 I have shown a preferred form of my invention in which 10 represents the hub of a wheel provided with radially extending spokes 11. Each of the spokes is provided with an inclined seat 12 and a horizontally arranged seat 13. A rim 14 having a beveled annular seat 15 is adapted to be first slipped over the ends of the spokes into the position shown in Fig. 1 with the tapered annular seat 15 lying against the inclined seat 12. Next a spacer element 16 is slipped into position over the end of the spoke as best illustrated in Figs. 1 and 4. This spacer element has downwardly extending portions 17 contiguous with the portion resting against the horizontally extending seat 13 of the spoke, and inwardly extending portions 18 contiguous with the portions 17 adapted to underlie the extending ledge portions 19 on the ends of the spokes whereby to prevent outward and peripheral movement of the elements 16 and assist in guiding the element axially into its proper operative position shown in Fig. 1, as well as to locate the same in that position. The spacing element 16 is also provided with ribs 20 and 21, the former one of which abuts against a portion of the rim 14 and the latter of which forms an abutment against which a portion of the rim 22 abuts somewhat as in the usual spacer-band-type of dual rim mounting. The rim 22 has an annular beveled seat 23 and a clamping means in the form of a wedge is adapted to be arranged between this seat and the horizontal seat 13 on the spoke.

The form of clamping means used in the present invention comprises in Fig. 1 an annular ring 24 having a wedge portion 25 arranged between the annular seat 23 and the horizontal seat 13. The ring also has a portion 26 substantially in a plane perpendicular to the axis of the wheel and this portion is provided with a series of openings 27 for the reception of stud bolts 28, which in turn have nuts 29 threaded thereon for the purpose of drawing the ring 24 to the left in Fig. 1, whereby the wedge portion 25 thereof firmly clamps both rims in position in a manner which is well understood in this art. In order to provide for flexibility of the wedge portions 25 in a radial direction, I preferably provide the wedge portion with notches, such as 30, the same being spaced peripherally of the wedge portion whereby when the clamping action takes place the wedge portion 25 can move inwardly or outwardly as required to accommodate the wedge ring to the clamping operation and to insure positive contact of the wedge portion 25 with the rim and spoke ends, I have found it is only necessary to provide one notch 30 between each pair of openings 27, but obviously the number of these notches may be varied without departing from the spirit of this invention.

To the outer surface of this wedge ring I preferably permanently secure a disc 31 which covers one entire side of the wheel, this disc being shaped somewhat as illustrated in the drawings to give an attractive appearance to the wheel, although it is obvious that other shapes may be used without departing from the spirit of this invention or the scope of the appended claims. It is obvious that while I prefer to permanently secure the disc to the ring 24 the same may be made separate therefrom and detachably secured thereto, or may even be formed as a separate element and clamped in place simultaneously with the clamping of the ring, as will be pointed out hereafter in connection with the form of the invention shown in Fig. 5.

With a wheel constructed according to the form of the invention shown in Fig. 1, it is obvious that when the clamping nuts 29 are removed the disc 31 and clamping ring 24 may be simultaneously removed and the rims thereafter removed quickly by an axial movement of the same, the spacing elements 16 being removed after the rim 22 has been removed in order that rim 14 may then be removed from the same side of the wheel as is the rim 22.

In Fig. 1, it will be noted that the disc 31 is turned inwardly slightly as at 32 to embrace the outer peripheral edge of the ring 24 and this inturned portion may form the sole means for connecting the disc to the ring, but it is preferred that some more positive means be used, such as welding, for holding these parts together. By turning in the edge of the disc as at 32, however, a neater appearance is given to the assembly and the peripheral edge of the disc is braced against distortion.

Figure 3:
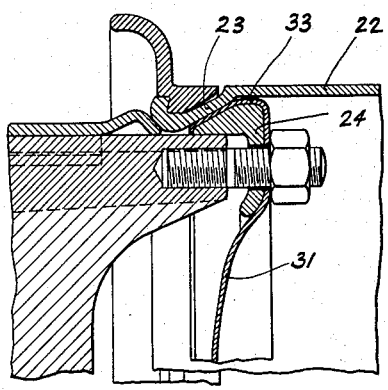
Fig. 3 shows a vertical cross-section of a modified clamping means embodying my invention.
Figure 5:
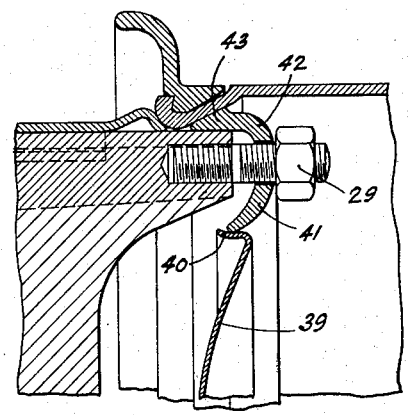
Fig. 5 is a vertical cross-section of a further modification of my invention.
Figure 6:
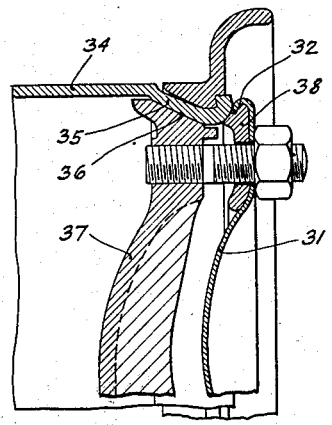
Fig. 6 is a vertical cross-section of still another modification of my invention.

In the forms of the invention shown in Figs. 3, 5 and 6 the same reference characters apply to corresponding parts in Fig. 1.

In Fig. 3 the clamping ring 24 is substantially the same as that shown in Fig. 1, but the inturned edge 33 of the clamping disc 31 extends entirely over the outer peripheral surface of the clamping ring, so that a portion of the disc itself is clamped between the annular seat 23 on the rim 22 and the clamping ring 24, thus efectively holding the disc 31 against relative movement with respect to the wheel and insuring that there will be no vibratory movement of the disc 31 as the wheel rotates.

In Fig. 6 I have illustrated a mounting for a single rim 34 in which the same is provided with an annular tapered seat 35 resting on an inclined seat 36 on the end of a spoke 37, the same being clamped in position by a clamping ring 38 similar to the clamping ring 34. In this form of the invention the disc 31 is held in place on the clamping ring 38 by an inturned portion 32 as in the form of the invention shown in Fig. 1.

In Fig. 5 the clamping disc 39 is provided with an inturned peripheral edge 40 which is concave on the outer side thereof to receive the tail portion 41 of the clamping ring 42, the clamping ring being provided with a wedge portion 43 similar to the wedge portion 45 in Fig. 1. When the nut 25 is tightened the wedge portion 43 clamps the rings in position on the wheel and the tail piece 41 is wedged downwardly against the outer periphery of the disc 39 to hold the disc firmly in position due to the contraction of the ring during the clamping operation. When the nuts 29 are removed the clamping ring and disc 39 may be removed and the disc 39 separated from the clamping ring. The concave peripheral edge is such that the disc is snapped into place with a slight amount of pressure before the clamping pressure is applied to the ring by the nuts 29, whereby to insure an initial holding force between the disc and clamping ring before the clamping force is applied to the clamping ring in the manner set forth.

Obviously, those skilled in the art to which this invention pertains may make various changes in the particular arrangement of the parts shown in the accompanying drawings without departing from the spirit of this invention and, therefore, I do not wish to be limited in my invention except as hereinafter set forth in the claims hereunto appended.

Having thus fully described my invention, what I claim and desire to secure by Letters Patent of the United States is:

1. A rim-holding device for wheels comprising a substantially rigid clamping ring and a metal disc spanning the opening in said ring and rigidly secured thereto to form an integral structure, and means for clamping said ring and disc securely to a wheel for holding a rim in place thereon, said ring having an axially extending wedge portion provided with at least one substantially radial slot to permit slight radial expansion under the clamping force exerted on the ring during the clamping operation.

2. A rim-holding device for wheels comprising a substantially rigid clamping ring and a metal disc spanning the opening in said ring and rigidly secured thereto to form an integral structure, and means for clamping said ring and disc securely to a wheel for holding a rim in place thereon, the edge of said disc embracing the outer periphery of said ring, and overlying that portion thereof which is adapted to engage the rim when the holding device is in place.

JOSEPH G. SWAIN.